: 3,502,594
SYNERGISTIC ANTIOXIDANT COMPOSITION FOR NATURAL OLEAGINOUS MATERIALS
Gerhard W. Ahrens, 1781 E. 15th St., Brooklyn, N.Y. 11229
No Drawing. Filed Dec. 28, 1965, Ser. No. 517,103
Int. Cl. C09k 3/00; A61k 7/00; A61l 23/00
U.S. Cl. 252—404
4 Claims

ABSTRACT OF THE DISCLOSURE

Liquid, lipid-solule, antimicrobially active synergistic antioxidant compositions for natural phospholipid-containing, nonhardening type oleaginous materials useful in cosmetic, perfume, baby-care and/or medical preparations are provided which consist essentially of predominant amounts of edible, antimicrobially active, liquid phenylic aromatic alcohols selected from the group having the OH-group on a straight side chain of from 1–3 $CH_2$ groups attached to a benzene ring carrying permanently solvated therein minor amounts of a synergistic antioxidant system formed between synergistically active ratios of Δ-ascorbic acid and alpha-tocopherol.

---

This invention relates to novel synergistic antioxidant compositions for natural phospholipid-containing, nonhardening type oleaginous materials and more particularly to liquid, lipid-soluble, antimicrobially-active synergistic antioxidant compositions for the prevention of oxidative rancidity in natural nonhydrous phospholipid-containing nonhardening type oleaginous materials useful in cosmetic, perfume, baby-care and/or medical preparations.

To inhibit oxidation rancidity, the objectionable odor and flavor imparted to natural nonhydrous oleaginous materials by the action of atmospheric oxygen, it is common practice to incorporate various antioxidants or rancidity-inhibiting agents with the same.

It is known that L-ascorbic acid possesses rancidity-inhibiting properties for nonhydrous fatty materials which contain by nature or by addition phenolic-group inhibitors, e.g. alpha-tocopherol, and it has already been proposed to utilize L-ascorbic acid as antioxidant for aqueous natural oil emulsions, e.g. such made with olive oil which contains appreciable amounts of natural phospholipids with naturally present phenolic inhibitors. It has been postulated that the antioxidant effect of L-ascorbic acid in fat systems is due to synergism in conjunction with phenolic groups present in the fat systems, e.g. quinones, and that this synergism exerts itself even at the most minute amounts of L-ascorbic acid being present in such a fat system and that it extends to other phenolic fat stabilizers, e.g. alpha-tocopherol, and it has been proven that one of the most effective by weight ratios between L-ascorbic acid and alpha-tocopherol used in conjunction with one another to obtain synergistic action in fat systems would be 0.021% L-ascorbic acid to 0.04% of alpha-tocopherol by weight of fatty material. Utilizing this system, however, and to be suitable for use in fatty materials, the L-ascorbic acid had first to be converted from the lipid-insoluble ino a lipid-soluble form, for instance by means of suitable esterification and formation of a fatty acid ester thereof and could then, in this form, be used and has already been used, in this form, successfully in conjunction with the alpha-tocopherol to form with the same said synergistic antioxidant system useful in efficiently preventing the development of oxidation rancidity in fatty materials to which it had been added, although the costs for the first conversion of he L-ascorbic acid into a useful lipid-soluble form had proved quite prohibitive for economical application. As a matter of fact, the insolubility of L-ascorbic acid in nonhydrous fatty materials thus limited its usefulness and utility for its possibly direct use even in conjunction with alpha-tocopherol for failure of intersolubility with a lip-soluble material, particularly with natural nonhydrous, phospholipid-containing, nonhardening type oleaginous materials.

However, I have now discovered that L-ascorbic acid can be utilized without prior conversion into, for instance, a fatty acid ester, to act as synergistic antioxidant constituent in conjunction with alpha-tocopherol, for natural phospholipid-containing, nonhardening type oleaginous materials if it is solvated and carried in sufficient amounts, together with sufficient amounts of alpha-tocopherol to constitute an efficient synergistic antioxidant system, in an edible phenylic aromatic alcohol selected from the group having the OH-group on a straight side chain of from 1–3 $CH_2$-groups attached to a benzene ring.

Using either one of the phenylic aromatic alcohols selected from the group having the OH-group on a straight side chain of from 1–3 $CH_2$-groups attached to a benzene ring, e.g. benzyl alcohol of the formula $C_6H_5CH_2OH$; beta-phenylethyl alcohol of the formula

or phenyl-propyl alcohol of the formula

composition prepared in this manner are liquid, lipid-soluble and antimicrobially-active synergistic antioxidant compositions eminently suitable for preventing the development of oxidation rancidity in natural phospholipid-containing, nonhardening type oleaginous materials to be used in cosmetic, perfume, baby-care and/or medical preparations. Too, these new compositions dissolve easily in and remain permanently dissolved in the said oleaginous materials and retain solvated therein the originally lipid-insoluble solubilized L-ascorbic acid constituent being a part of these compositions thus representing an unexpected result which, together with the beneficial antimicrobial activity also being exerted by these new synergystic antioxidant compositions of the invention as a result of the presence therein of predominant amounts of combined phenylic aromatic alcohol carrier constituents, renders the use of these liquid, lipid-soluble, antimicrobially active synergistic antioxidant compositions in oleaginous materials, particularly natural, phospholipid-containing, nonhardening type materials, extremely desirable and advantageous in conjunction with cosmetic, perfume, baby-care and/or medical preparations and qualifying such oleaginous materials modified by the addition of any of these new compositions of the invention to be useful replacements for mineral oil base materials not only with respect to attainable stabilities but also qualitatively, as natural oleaginous materials are considered more desirable, from the dermatological point of view, to be in contact with the human skin than mineral oils and so-called vaselines which are still widely used in the fields of cosmetic, baby-care and medical preparations and therein exerting their known drying out effects on the human skin as well as failing to possess any beneficial biological effects of their own which, however, are shown by natural oleaginous materials, particularly those which have been modified by the additions thereto of any of the compositions of the invention. Thus, natural phospholipid-containing, nonhardening type oleaginous materials to which were added any of the liquid, lipid-soluble, antimicrobially active synergistic antioxidant compositions of the invention as described, are not only sufficiently stable to be comparable with mineral oils and so-called vaselines but also able to beneficially replace the same in all applications concerning their use in cosmetic, perfume, baby-care and/or medical prepartions and are also superior to mineral oils and/or vaselines in that they offer beneficial biological effects of their own, in addition to benefits resulting from the presence of L-ascorbic acid or Vitamin C and alpha-tocopherol or Vitamin E, namely of phospholipids therein which are so highly desirable on account of their known superior skin softening, antikeratos- and emollient effects on the skin, enabling even offsetting of existing imbalances in the skin lipid contents that may be the cause of dermal impairments, and these modified natural oleaginous compositions offer, too, in addition, antimicrobial effects, thus, are, summarily, far superior for use in conjunction with cosmetic, perfume, baby-care and/or medical preparations than mineral oils and/or vaselines by the mere simple addition thereto of the liquid, lipid-soluble, antimicrobially active synergistic antioxidant compositions of the invention which, in addition, may conveniently be stored indefinitely and ever be held in readiness for immediate use.

Now, in preparing, for instance, vaseline-like natural oleaginous materials containing phospholipids and being of the nonhardening type and possessing a shelflife and storage qualities comparable with mineral oil base vaselines by the addition thereto and dissolution therein of sufficient amounts of any one of the synergistic antioxidant compositions of the invention, the type of oleaginous material to be used must be carefully chosen, for instance, should be selected from amongst a group of natural nonhardening type oils including sweet almond oil, avocado pear oil, peachkernel oil and the like, and the liquid lipid-soluble, antimicrobially active synergistic antioxidant composition of the invention selected from amongst its group of compositions added thereto by means of simply stirring same into the oil, at a temperature not higher than 70° C. or without heating, until clear. To the thus modified oils are now added sufficient amounts of natural fatty acid esters, a single one or several in combination, capable of forming with the oil, on cooling, a vaseline-like consistency preparation, possessing all the smoothness and homogeneity of mineral oil base vaselines. The employed fatty acid esters for forming these vaseline-like consistencies upon dissolution in the modified oils are preferably selected from the group of edible type fatty acid esters, including glyceryl-, sorbitol and mannitol fatty acid esters, for instance glyceryl mono stearates or palminates, sorbitol mono-stearates or palmitates and mannitol monostearates and palmitates.

A preferred method of preparing the liquid lipid-soluble, antimicrobially-active synergistic antioxidant compositions of the invention for use in the protection against the development of oxidation rancidity of natural nonhydrous phospholipid-containing, nonhardening type oleaginous materials is illustrated in the following examples.

EXAMPLE I

Employing benzyl alcohol as the phenylic aromatic alcohol carrier constituent in the preparation of the liquid lipid-soluble, antimicrobially active synergistic antioxidant composition of the invention, I first dissolve 21 grams of L-ascorbic acid in 939 grams of the benzyl alcohol by heating the mixture slowly in a cork-stoppered glass vessel, under constant agitation, to 125° C. and holding this temperature for about 10 minutes after which time all the crystallinic L-ascorbic acid is permanently solvated. This is followed by cooling the solution obtained to about 70° C. and the addition of 40 grams of alpha-tocopherol acetate which easily dissolves in the still warm liquid holding the aforesaid 21 grams of L'ascorbic acid already in solution. This resulting liquid constitutes one of the liquid antioxidant compositions of the invention carrying in the benzyl alcohol as the constituent part thereof 2.1% L-ascorbic acid and 4.0% of alpha-tocopherol acetate, is indefinitely storable and always available for immediate use as an additive to natural nonhydrous phospholipid-containing nonhardening type oleaginous materials to supply therein, e.g. if added in an amount of 1% on the weight of such oleaginous material, sufficient amounts of this synergistic antioxidant composition to confer upon the said oleaginous material the desired protection against the development of oxidation rancidity and for periods of time long enough to be comparable with the inherent stabilities of mineral oil base fatty compositions such as vaselines. The addition of 1% of the synergistic antioxidant composition in this example to oleaginous composition constitutes the presence in the latter of 0.021% L-ascorbic acid, 0.040% alpha-tocopherol acetate and 0.939% benzyl alcohol as the carrier constituent thereof and thus the equivalent of a highly effective synergistic antioxidant system possessing, in addition, also antimicrobial properties.

EXAMPLE II

Employing beta-phenylethylalcohol as the phenylic aromatic alcohol carrier constituent in the preparation of the liquid liquid-soluble, antimicrobially-active synergistic antioxidant composition of the invention, I first dissolve 21 grams of L-ascorbic acid in 1,339 grams of the beta-phenylethyl-alcohol by heating the mixture slowly in a cork-stoppered glass vessel, under constant agitation, to 125° C. and holding this temperature for about 10 minutes after which time all the crystallinic L-ascorbic acid is permanently solvated. This is followed by cooling the solution obtained to about 70° C. and the addition of 40 grams of alpha-tocopherol acetate which easily dissolves in the still warm liquid holding the aforesaid 21 grams of L-ascorbic acid already in solution. This resulting liquid constitutes one of the liquid antioxidant compositions of the invention carrying in the beta-phenylethyl-alcohol as the constituent part thereof 1.5% L-ascorbic acid and 2.857% alpha-tocopherol acetate, is indefinitely storable and always available for immediate use as an additive to neutral nonhydrous phospholipid-containing nonhardening type oleaginous materials to supply therein, e.g. if added in an amount of 1.4% on the weight of such oleaginous material, sufficient amounts of this synergistic antioxidant composition to confer upon the said oleaginous material the desired protection against the development of oxidation rancidity and for periods of time long enough to be comparable with the inherent stabilities of mineral oil base fatty compositions such as vasalines. The addition of 1.4% of the synergistic antioxidant composition in this example to oleaginous material constitutes the presence in the latter of 0.021% L-ascorbic acid, 0.04% alpha-tocopherol acetate and 1.339% beta-phenylethyl-alcohol as the carrier constituent thereof and thus the equivalent of a highly effective synergistic antioxidant system possessing, in addition, also antimicrobial properties.

EXAMPLE III

Employing phenyl-propyl alcohol as the phenylic aromatic alcohol carrier constituent in the preparation of the liquid lipid-soluble, antimicrobially-active synergistic antioxidant compositions of the invention, I first dissolve 21 grams of L-ascorbic acid in 1,949 grams of phenylpropyl alcohol by heating the mixture slowly, and under constant agitation, in a cork-stoppered glass vessel to 125° C. and holding this temperature for a period of about 10 minutes after which time all the crystallinic L-ascorbic acid is permanently solvated. This is followed by cooling the solution obtained to about 70° C. and the addition of 40 grams of alpha-tocopherol acetate which easily dissolves in the still warm liquid holding the aforesaid 21 grams of L-ascorbic acid already in solution. This resulting liquid constitutes one of the synergistic anti-oxidant compositions of the invention carrying in the phenylpropyl alcohol constituent part thereof 1.05% L-ascorbic acid and 2.0% alpha-tocopherol acetate, is indefinitely storable and always available for immediate use as an additive to natural nonhydrous phospholipid-containing nonhardening type oleaginous materials to supply therein, e.g. if added in an amount of 2% on the weight of the oleaginous material, sufficient amounts of this synergistic antioxidant composition of the invention to confer upon the said oleaginous material the desired protection against the development of oxidation rancidity and for periods of time comparable with the inherent stabilities of mineral oil based fatty compositions such as vaselines. The addition of 2% of the synergistic composition in this example to oleaginous materials constitutes the presence in the latter of 0.021% L-ascorbic acid, 0.04% alpha-tocopherol acetate and 1.949% phenylpropyl alcohol as the carrier constituent thereof and thus the equivalent of a highly effective synergistic antioxidant system possessing, in addition, also antimicrobial properties.

The addition to the natural phospholipid-containing, nonhardening-type oleaginous material of more or less of either of the synergistic antioxidant compositions of the invention as referred to in the above examples shall be within the scope of this invention as shall also be the use of either two or all three such compositions of the examples together. Too, it shall also be understood that the amounts of L-ascorbic acid and alpha-tocopherol acetate as well as the type of alpha-tocopherol employed and carried as constituent parts in the synergistic antioxidant compositions of the invention may vary without departing from the scope of this invention, and it shall also be within the scope of this invention to employ any of the synergistic antioxidant compositions thereunder independent of their presence in fatty materials, for instance on account of their antimicrobial and/or vitaminic effects for appropriate uses.

What I claim is:

1. A liquid, lipid-soluble, antimicrobially active synergistic antioxidant composition for neutral phospholipid-containing nonhardening type oleaginous materials consisting essentially of about 97 to 94% by weight of a liquid, edible, antimicrobially active phenylic aromatic alcohol selected from the group having the OH-group on a straight side chain of from 1 to 3 $CH_2$ groups attached to a benzene ring carrying permanently solvated therein minor amounts of from 3 to 6% by weight of a synergistic antioxidant consisting of from 1 to 2% by weight L-ascorbic acid and 2 to 4% by weight alpha-tocopherol acetate.

2. The liquid synergistic antioxidant composition of claim 1, in which the phenylic aromatic alcohol constituent therein is benzyl alcohol of the formula $C_6H_5CH_2OH$.

3. The liquid synergistic antioxidant composition of claim 1, in which the phenylic aromatic alcohol constituent therein is beta phenyl ethyl alcohol of the formula $C_6H_5CH_2CH_2OH$.

4. The liquid synergistic antioxidant composition of claim 1, in which the phenylic aromatic alcohol constituent therein is beta phenyl propyl alcohol of the formula $C_6H_5CH_2CH_2CH_2OH$.

References Cited

UNITED STATES PATENTS

| | | | |
|---|---|---|---|
| 2,440,383 | 4/1948 | Riemenschneider | 252—407 X |
| 2,895,878 | 7/1959 | Lehman | 252—404 X |
| 3,151,127 | 9/1964 | Spanel | 260—343.7 |
| 3,294,825 | 12/1966 | Pottier | 252—407 X |

LEON D. ROSDOL, Primary Examiner

I. GLUCK, Assistant Examiner

U.S. Cl. X.R.

99—163; 252—407; 260—398.5

UNITED STATES PATENT OFFICE
CERTIFICATE OF CORRECTION

Patent No. 3,502,594                                  March 24, 1970

Gerhard W. Ahrens

It is certified that error appears in the above identified patent and that said Letters Patent are hereby corrected as shown below:

Column 1, line 12, "lipid-solule" should read -- lipid-soluble --; line 24, "Δ-ascorbic" should read -- L-ascorbic --. Column 2, line 4, "lip-soluble" should read -- lipid-soluble --. Column 5, line 32, "neutral" should read -- natural --.

Signed and sealed this 22nd day of December 1970.

(SEAL)
Attest:

Edward M. Fletcher, Jr.                            WILLIAM E. SCHUYLER, JR.
Attesting Officer                                     Commissioner of Patents

UNITED STATES PATENT OFFICE
CERTIFICATE OF CORRECTION

Patent No. 3,502,594     Dated   March 24, 1970

Inventor(s)   Gerhard W. Ahrens

It is certified that error appears in the above-identified patent and that said Letters Patent are hereby corrected as shown below:

Column 6, line 18, cancel "beta".

Signed and sealed this 15th day of June 1971.

(SEAL)
Attest:

EDWARD M. FLETCHER, JR.  
Attesting Officer

WILLIAM E. SCHUYLER, JR.  
Commissioner of Patents